March 11, 1969   D. M. NELSON   3,431,794
CABLE CONTROL
Filed July 1, 1966
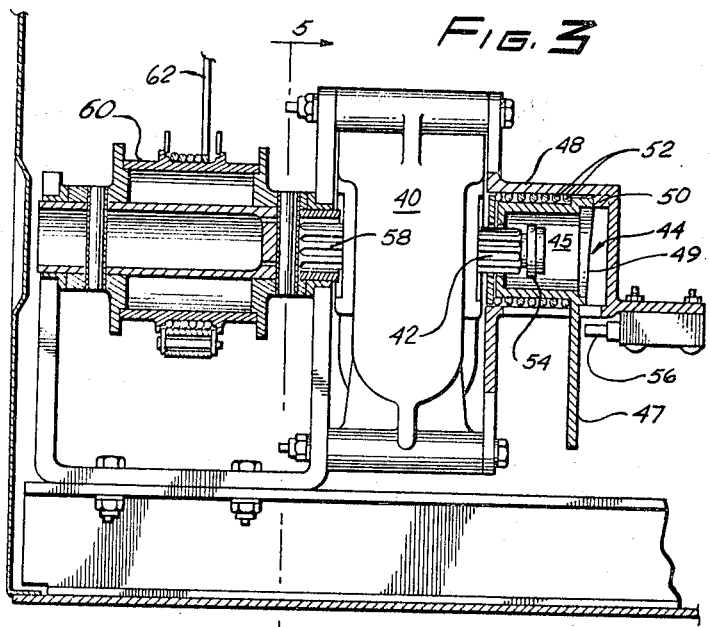
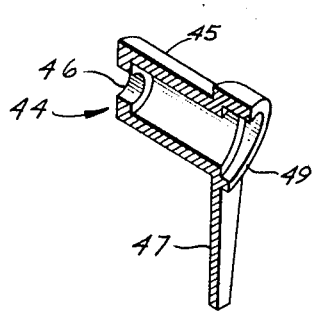
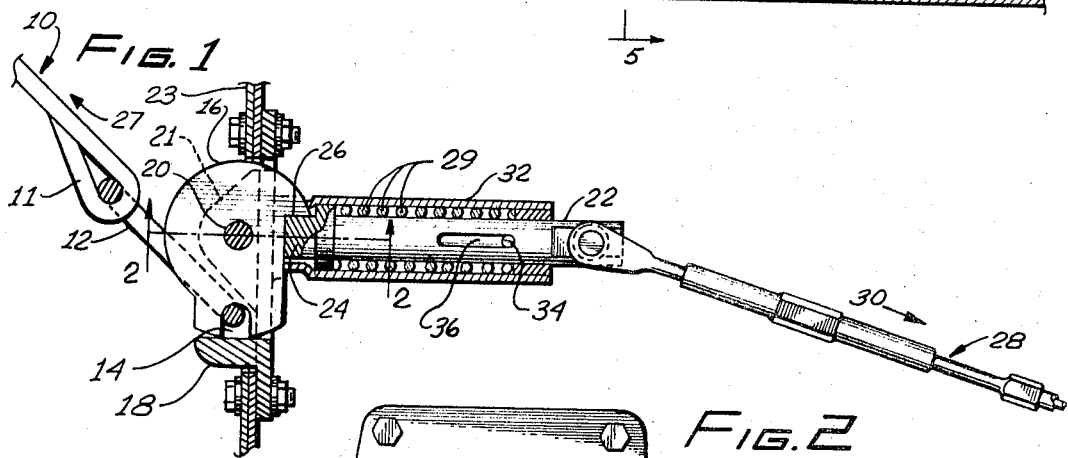
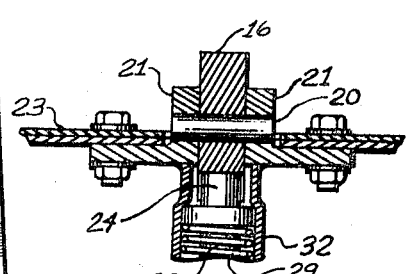
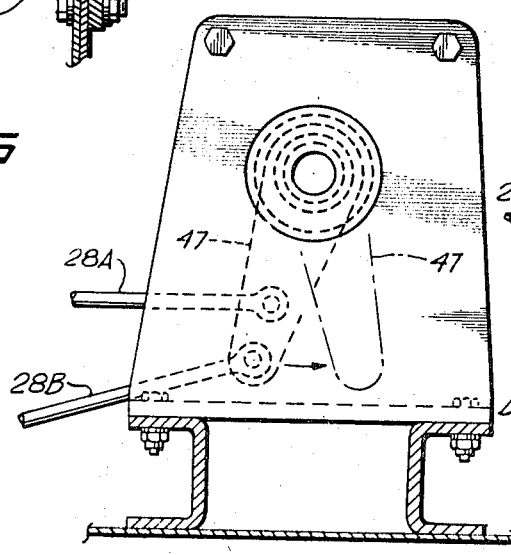
INVENTOR.
DONALD M. NELSON
By Sidney Magnes

United States Patent Office 3,431,794
Patented Mar. 11, 1969

3,431,794
CABLE CONTROL
Donald M. Nelson, Anaheim, Calif., assignor to North American Rockwell Corporation, a corporation of Delaware
Filed July 1, 1966, Ser. No. 562,213
U.S. Cl. 74—529
Int. Cl. G05g 5/06
12 Claims

ABSTRACT OF THE DISCLOSURE

This invention relates to cable control; and more particularly to a latching and an unlatching arrangement for the control of cables that are used for lifting, pulling, or the like. The disclosed arrangement controls the cable by latching the cable at a given length, and then releasing the latch. The latching arrangement comprises a cam-like disc having (1) a peripheral shoulder, and (2) a peripheral recess; a cable bight or ring being captured in the recess to latch the cable to a predetermined cable-length, and a locking-pin abutting the shoulder of the cam to lock the cam at the latched cable length. To release the latch, the locking-pin is retracted from its abutment with the shoulder of the cam; and the capture ring is then released.

BACKGROUND

There are many device sthat use cables for lifting, pulling, or for control purposes; examples of these devices being derricks, cranes, lifts, elevators, and the so-called Rogallo wing—which is a flexible wing vehicle having a load platform suspended beneath the wing—the wing-positions being controlled by paying-out or reeling-in various cables. In devices of the above types, it is frequently important that a cable be securely "latched" at a particular length; this latching-length being selected for safety or for maintenance of predetermined conditions until a selected state is achieved. Once this selected state is achieved, the cable is then unlatched; and—depending upon the usage—the unlatched cable may be left to dangle freely, or a reel may then be turned to pay-out or reel-in the cable.

For example, in certain Rogallo-wing uses, selected cables have one end fastened to the wing, and have their other end latched at the load platform—and the cable is loosely stowed in a stowage compartment. In deploying the Rogallo-wing, the latched cables suspend the load platform below the Rogallo-wing, the selected lengths of latched cable causing the Rogallo-wing to assume a parachute-like configuration until stability is achieved. At that time, the cables are unlatched, and the Rogallo-wing assumes another configuration—which may be another latched-cable condition, or may be a condition wherein the cable-lengths are continuously controlled by motorized reels.

OBJECTS AND DRAWINGS

It is an object of the present invention to provide an improved cable-control arrangement.

It is another object of the present invention to provide an improved latching mechanism.

It is a further object of the present invention to provide an improved unlatching mechanism.

The obtainment of these objects and others will be realized from the teachings of the specification taken in conjunction with the drawings, of which:

FIGURE 1 shows a latching mechanism;
FIGURE 2 shows a cross-section of the latching arrangement of FIGURE 1;
FIGURE 3 shows an unlatching arrangement;
FIGURE 4 shows a portion of the unlatching arrangement; and
FIG. 5 shows another portion of the unlatching arrangement.

SYNOPSIS

Broadly speaking, the cable-latching arrangement comprises a latching-hook or ring attached to, or integral with, the cable; this ring being adapted to fit into a recess of a rotatable cam member that is locked against rotation. At a given condition, the cam is freed, so that it may rotate and free the ring; whereupon the cable is unlatched, and may be payed-out, or reeled-in.

The unlatching arrangement comprises an unlatching arm that may be moved angularly and axially. When the arm is moved through a short angular distance, an unlatching cable connected between the unlatching arm and the latching arrangement, releases the latching arrangement. The angular movement of the unlatching arm also causes it to move axially until the arm reaches a particular position where it is disengaged, and operates a limit switch that indicates that the unlatching arm has performed its function.

LATCHING

The latching arrangement will be understood by referring to FIGURES 1 and 2. As indicated previously, a cable 10 is to be latched to a given length; so a bight or eye 11 is formed—in a manner well known to those in the art—to the end or to an intermediate portion of the cable. Eye 11 has a suitable latching hook or ring 12 attached thereto.

In order to capture latching ring 12, mounting means—such as a bracket 21—is bolted or otherwise affixed to a portion 23 of the load platform; bracket 21 having a pin 20 on which a rotatable cam member 16 is pivoted. Member 16 contains a radial slot, or recess, 14 for receiving latching hook 12, which is of suitable configuration and cross-section to be captured between the walls of recess 14 and an anchor 18 that may be part of bracket 21.

For reasons to be discussed later, a housing 32 is affixed, as by welding, to bracket 21; housing 32 containing a slidably retractable locking pin 22 having a protrusion 24 that engages a peripheral shoulder 26 on cam member 16. A spring 29, positioned between an end wall of housing 32 and a flange on locking pin 22, urges protrusion 24 into engagement with shoulder 26 of cam member 16.

FIGURE 2 is a cross sectional view, taken as indicated in FIGURE 1, and shows bracket 21 as having two spaced-apart ears that support pin 20 on which cam member 16 is pivoted. Protrusion 24 of locking pin 22 is engaged in shoulder 26 (not shown in FIGURE 2) of cam member 16, under the urging of spring 29; locking pin 22 and spring 29 being positioned in housing 32, which may be affixed to bracket 21.

To summarize the latched operation, it will be noted—in FIGURE 1—that load-cable 10 is trying to move to the left as indicated by arrow 27; anchor 18 preventing hook 12 from dropping out of recess 14 if the tension of cable 10 should be momentarily relieved. This tension exerts a force on latching hook 12, this force trying to turn cam 16 in a clockwise direction. However, cam 16 is prevented from turning, because protrusion 24 engages shoulder 26. Thus, a definite length of load-cable 10 has been payed-out; and load-cable 10 is latched to prevent further cable movement.

UNLATCHING

In order to unlatch load-cable 10, locking-pin 22 must be moved to the right against the pressure of spring 29; this rightward movement, and spring 29, being guided by a housing 32 that is fixedly secured to the support member 21 on which the cam is pivoted. The amount of rightward movement is limited by a limit pin 34 sliding in a slot 36.

The unlatching operation may be achieved by having an explosive squib move locking pin 22 to the right; but a reusable mechanical unlatching arrangement is generally preferable. The disclosed arrangement operates as follows. When unlatching-cable 28 is moved to the right as indicated by arrow 30, locking-pin 22 also moves to the right; its protrusion 24 being pulled away from shoulder 26. The retraction of protrusion 24 permits cam 16 to rotate clockwise under the force applied by load-cable 10, and frees latching-hook 12 from its capturing recess 14; thus unlatching cable 10. Load-cable 10 may now move freely outwardly. In some arrangements, load cable 10 terminates at bight 11, and dangles freely after being unlatched; in other cases, cable 10 has other latching bights affixed to it at different points along its length; and in still other cases, cable 10 is wound on a reel which is able to pay-out or reel-in the now unlatched cable 10.

As indicated above, for the unlatching operation, the unlatching cable 28 must be moved in the direction of arrow 30; and the activation of the unlatching operation may be understood from FIGURE 3. This illustration shows means for operating the mechanism of FIGURE 1. In FIGURE 3, a driving means 40, such as a motor, or a reel that can be rotated by a lanyard, has a splined shaft 42. Mounted on shaft 42 is an unlatching assembly 44, shown in greater detail in FIGURE 4. This assembly comprises a cup-like portion 45 having its bottom (at the left of FIGURE 4) pierced by a splined hole 46 that slideably engages the previously-described splined shaft 42 of actuator 40. An unlatching arm 47, which may be an integral part of assembly 44, as shown in FIGURES 3 and 4, protrudes through an opening in housing 48. At the end adjoining unlatching arm 47, there is provided a tapered flange 49 that cooperates with a cam follower or boss 50 formed on the inner surface of housing 48 so as to shift assembly 44 longitudinally as it rotates.

When motor 40 is energized, its splined shaft 42 rotates, and causes cup-like portion 45 and unlatching arm 47 to move through a predetermined angular distance of about thirty degrees. During this angular movement, cup 45 rotates, and its tapered flange 49 rides along boss 50 of housing 48. The camming arrangement 49, 50 eventually causes cup 45 to move longitudinally outward under the urging of a spring 52; the splines of hole 46 sliding along the splines of shaft 42. When the camming arrangement 49, 50 has moved assembly 44 its permitted axial distance, the splined hole 46 moves onto a reduced diameter portion of shaft 42; and further axial movement is stopped by means such as a collar or a drive pin 54 formed on the end of shaft 42; whereupon assembly 44 is disengaged from shaft 42, which may continue to rotate without having any effect on assembly 44. At this same time, the longitudinal movement of unlatching arm 47 causes it to contact a limit-switch 56, whose output indicates that unlatching assembly 44 has accomplished its desired purpose. Thus unlatching arm 47 has been rotated, and has been disengaged from shaft 42.

Referring now to FIGURE 5, it may be understood that as assembly 44 rotates in a counterclockwise direction, unlatching arm 47 moves about thirty degrees from its dotted-line position to its dot-dash line position; this movement pulling on an unlatching linkage such as control cables 28A and 28B, one of these being entrained over pulleys (not shown) and being suitably connected with the control cable 28 shown in FIGURE 1 as releasing the latch. Alternatively, one of the control cables 28A or 28B may be connected to a bell-crank, that in turn pulls additional control cables.

Referring back to FIGURE 3, it will be realized that as soon as unlatching arm 47 has moved its desired angular distance, its work is completed, and no further angular movement is desired. The limiting of the angular movement has been accomplished by the camming action of boss 50 and tapered flange 49, which advanced the splined hole 46 to the reduced-diameter portion of shaft 42; but may be further limited by the use of a suitably sized slot in housing 48, through which unlatching arm 47 protrudes. When unlatching arm 47 has abutted the end of its slot, and hole 46 is riding on the reduced diameter portion of shaft 42, assembly 44 is disengaged from the driving means 40, and is held in this position by the action of spring 52.

In this way, the unlatching operation has been initiated and completed, and load-cable 10 is free to perform its desired function.

In order to relatch load-cable 10, unlatching arm 47 is rotated manually in a clockwise direction to its dotted-line position; this movement re-engaging the splines; and returning cup 45 and tapered flange 49 to their original positions relative to boss 50. Unlatching cables 28A and 28B are thus loosened; and the latch of FIGURE 1 may now be reset, as follows.

Referring back to FIGURE 1, it will be recalled that in the unlatching operation, locking pin 22 was retracted to the right; and cam member 16 rotated in a clockwise direction to unlatch the cable. Cam member 16 will stop its rotation at some random angular position, depending upon friction, cable tension, etc. During the re-latching operation, unlatching cable 28 is loosened, protrusion 24 of the locking pin 22 moves to the left under the urging of spring 29, and comes to rest against the circular peripheral portion of cam member 16. Latching ring 12 is then engaged in cam recess 14, and the cam is rotated manually in a counterclockwise direction. During this rotation, protrusion 24 rides along the circular peripheral portion of rotatable member 16 in the manner of a cam-follower riding along a cam. When the cam rotation brings it to the position shown in FIGURE 1, protrusion 24 snaps into engagement with shoulder 26, and the load-cable 10 is again latched. It will be understood that this cam and follower action permits the latch to be reset by external means, obviating access to the locking pin, the housing, and the unlatching cable.

The previous explanation has been presented in terms of a tapered flange 49 on assembly 44, and a boss 50 on the inside of housing 48; but, if desired, these may be reversed to taper the boss, rather than the flange.

As previously indicated, load-cable 10 must first be unlatched, after which it, or another cable, is payed-out or reeled-in. The previously described unlatching mechanism of FIGURE 1 may be initiated by an explosive squib, may be initiated manually, may be initiated by an unlatching motor, or—preferably—may be initiated by a motor shown in FIGURE 3 that first unlatches the cable as explained above, and then controls the rotation of a reel that pays-out or reels-in a cable. The latter common motor arrangement is preferred, for reasons of simplicity and compactness; and will be explained in connection with FIGURE 3.

Here motor 40 is energized and—as explained above—its first thirty degrees of rotation cause the unlatching arm 47 to pull on unlatching cables 28, which in turn unlatch the mechanism of FIGURE 1. Motor 40, having performed the unlatching operation is now used for another purpose, such as paying-out or reeling-in the same or another cable. This second function is also illustrated in FIGURE 3, wherein motor 40 has a second splined shaft 58 that rotates a reel 60 onto which a cable 62 is wound.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. A cable-latch for latching a cable having a latching ring affixed to said cable, comprising:
a rotatable cam member having a cable-capturing recess in its periphery—whereby said ring may be captured in said recess;
means, comprising a locking-pin adapted to act as a cam-follower capable of riding along the periphery of said cam, for locking said rotatable member against rotation—whereby said ring and cable are latched; and
means for releasing said locking means.

2. The combination of claim 1 including anchor means, fixedly-positioned adjacent to the periphery of said rotatable member, for preventing said captured ring from escaping from said recess of said cam when said cam is in its locked position.

3. The combination of claim 1 wherein said cam has a shoulder, said locking means comprises a slidable retractable locking-pin that engages said shoulder of said rotatable member and said releasing means comprises means for slidably retracting said locking-pin from its engagement with said shoulder, for permitting said cam member to rotate and free said ring from said recess.

4. The combination of claim 3 wherein said releasing means comprises unlatching cable means affixed to said slidable retractable locking-pin for slidably retracting said locking-pin from its engagement with said shoulder of said rotatable member.

5. A cable-latch for latching a ring on said cable, comprising:
a support;
a cam member having a recess and a shoulder in its periphery;
means for rotatably mounting said cam on said support;
an anchor fixedly-positioned with respect to said support adjacent the periphery of the cam in one position of rotation thereof—whereby said ring may be captured in said recess between said cam and said anchor;
a housing fixedly-positioned with respect to said support and said cam;
an axially-slidable locking-pin slidably positioned in said housing, said locking-pin having a protrusion engageable with said shoulder of said cam when said locking-pin is in its advanced position—whereby when said locking-pin engages said shoulder, said cam is locked against rotation;
an unlatching-cable;
means for attaching said unlatching-cable to said axially-slidable locking-pin axially for retracting said locking-pin from engagement from said shoulder—whereby said unlatching-cable may disengage said locking-pin from said cam, and said cam may then rotate to free said captured ring.

6. A cable control for latching and unlatching a cable having a latching ring affixed to said cable, comprising:
a rotatable cam member having a shoulder and a capturing recess in its periphery—whereby said ring may be captured in said recess;
means for locking said rotatable member against rotation, said locking means comprising a retractable locking-pin that engages said shoulder of said rotatable member—whereby said ring and cable are latched;
means for releasing said locking means, said releasing means comprising means for retracting said locking-pin from its engagement with said shoulder, for permitting said cam member to rotate and free said ring from said recess;
a splined shaft;
an unlatching arm mounted to be rotated by said splined shaft, and to be moved longitudinally along said splined shaft—whereby said arm may be moved angularly and longitudinally; and
means for linking said unlatched arm to said releasing means—whereby angular movement of said unlatching arm pulls said releasing means and retracts said locking-pin from engagement with said shoulder.

7. The combination of claim 6 including:
means for rotating said splined shaft and said unlatching arm; and
means for disengaging said unlatching arm from said splined shaft after a predetermined angular movement of said unlatching arm—whereby said splined shaft rotating means may then be used for another purpose.

8. The combination comprising:
a splined shaft;
an unlatching assembly, comprising an unlatching arm, mounted to be rotated by said splined shaft, and to be moved longitudinally along said splined shaft;
camming means for moving said unlatching arrangement longitudinally as said splined shaft rotates—whereby said unlatching arm is capable of both longitudinal and angular movement as said splined shaft rotates; and
an unlatching linkage attached to the end of said unlatching arm—whereby said unlatching linkage is moved longitudinally as said unlatching arm moves angularly.

9. The combination of claim 8 including disengagement for disengaging said unlatching arm from said splined shaft when said unlatching arm has moved a predetermined amount.

10. The combination of claim 9 comprising a housing for said combination, and wherein said camming means comprises a tapered sliding configuration between said housing and said unlatching arrangement, and a limit switch positioned to be energized when said unlatching arm has moved a predetermined distance.

11. The combination comprising:
a splined shaft;
a surrounding housing;
an unlatching arrangement, comprising an unlatchig arm projecting through an opening in said housing, mounted to be rotated by said splined shaft, and to be moved longitudinally along said splined shaft;
means for rotating said splined shaft—whereby said projecting unlatching arm moves in an angular manner;
an unlatching cable attached to the end of said unlatching arm—whereby said angular movement of said unlatching arm pulls an unlatching cable;
camming means comprising a tapered portion on said unlatching arrangement slidably positioned relative at a fixedly-positioned protrusion on the inner surface of said housing, for causing said unlatching arm to move longitudinally along said splined shaft;
limit switch means, positioned adjacent said projecting unlatching arm, for producing a signal when said unlatching arm has moved a predetermined longitudinal distance; and
disengagement means, comprising a portion of reduced shaft diameter, for disengaging said unlatching arm from said splined shaft when said arm has moved a predetermined longitudinal distance—whereby said shaft may continue to rotate without further moving said unlatching arm.

12. The combination of claim 11 including:
a rotatable member;
said rotatable member having a capturing recess in its periphery—whereby a locking ring, affixed to a cable, may be captured in said recess;
said rotatable member having a shoulder;
means for locking said rotatable member against rotation;
said locking means comprising a retractable locking pin having a protrusion that engages said shoulder of said member;
means for releasing said locking means;
said releasing means comprising said unlatching cable attached to said unlatching arm.

References Cited

UNITED STATES PATENTS

| 703,713 | 7/1902 | Smith et al. | 294—83 X |
| 2,754,073 | 7/1956 | Holm et al. | 244—122.19 |
| 2,868,581 | 1/1959 | Minty et al. | 244—151.2 X |
| 3,110,331 | 11/1963 | Buchanan. | |

FOREIGN PATENTS

| 102,245 | | Great Britain. |
| 556,006 | 9/1943 | Great Britain. |

MILTON KAUFMAN, *Primary Examiner.*

U.S. Cl. X.R.

294—83